(12) United States Patent
Wilson et al.

(10) Patent No.: US 11,653,632 B2
(45) Date of Patent: May 23, 2023

(54) LOW PROFILE BROODER

(71) Applicant: Gas Fired Products, Inc., Charlotte, NC (US)

(72) Inventors: Eddie Lee Wilson, Charlotte, NC (US); Michael Patrick Preusse, Charlotte, NC (US); Martin Spencer Brice, Charlotte, NC (US); Stephan Richter, Charlotte, NC (US)

(73) Assignee: GAS FIRED PRODUCTS, INC., Charlotte, NC (US)

( * ) Notice: Subject to any disclaimer, the term of this patent is extended or adjusted under 35 U.S.C. 154(b) by 319 days.

(21) Appl. No.: 17/014,238

(22) Filed: Sep. 8, 2020

(65) Prior Publication Data
US 2022/0071177 A1 Mar. 10, 2022

(51) Int. Cl.
*A01K 31/19* (2006.01)
*A01K 31/20* (2006.01)

(52) U.S. Cl.
CPC .............. *A01K 31/19* (2013.01); *A01K 31/20* (2013.01)

(58) Field of Classification Search
CPC ................................ A01K 31/19; A01K 31/20
See application file for complete search history.

(56) References Cited

U.S. PATENT DOCUMENTS

| 1,234,782 | A | * | 7/1917 | MacKay | A01K 31/19 |
| | | | | | 119/306 |
| 1,346,952 | A | * | 7/1920 | Goreau | F24H 1/145 |
| | | | | | 431/177 |
| 1,929,088 | A | * | 10/1933 | Wood | A01K 31/19 |
| | | | | | 119/304 |
| 2,235,635 | A | | 3/1941 | Herman | |
| 2,519,956 | A | | 8/1950 | Drout | |
| 2,526,748 | A | | 10/1950 | Hill | |
| 2,609,871 | A | * | 9/1952 | Brumbaugh | F23D 14/065 |
| | | | | | 239/553 |
| 2,694,445 | A | | 11/1954 | Sassmanhausen | |
| 2,771,131 | A | | 11/1956 | Hook | |

(Continued)

FOREIGN PATENT DOCUMENTS

FR 1449489 8/1966
GB 1243814 8/1971

OTHER PUBLICATIONS

Gas Burners Operating Principles, www.airheaters.info/gas-burners/gas-burners-operating-principles.html, Posted by Albert on Jan. 25, 2011 in Gas Burners.

*Primary Examiner* — Monica L Perry
*Assistant Examiner* — Brittany A Lowery
(74) *Attorney, Agent, or Firm* — Parker Poe Adams & Bernstein, LLP (57) ABSTRACT

A low profile brooder is provided, comprising a venturi, a burner base, a burner cap, and a baffle. The burner base and the burner cap reside adjacent to each other, with the burner cap disposed above the burner base and with a distribution chamber between them. A central axis is defined. A venturi resides below the burner base and is in fluid communication with the distribution chamber at the central axis. The venturi defines a fuel flow path between its upstream and downstream ends. The fuel flow path resides at least partially at one or more of an acute angle, a perpendicular angle, and an obtuse angle to the central axis. A baffle resides in the distribution chamber between the central axis and the periphery.

19 Claims, 8 Drawing Sheets

(56) References Cited

U.S. PATENT DOCUMENTS

| | | | |
|---|---|---|---|
| 2,851,092 A | 9/1958 | McKee | |
| 3,067,811 A | 12/1962 | Webster | |
| 3,139,881 A * | 7/1964 | Fannon, Jr. | A01K 31/20 |
| | | | 126/92 R |
| 3,314,610 A | 4/1967 | Reznor | |
| 3,412,940 A | 11/1968 | Ferroli | |
| 3,563,206 A * | 2/1971 | Hermann | A01K 31/20 |
| | | | 431/278 |
| 3,976,243 A * | 8/1976 | Christophel | A01K 31/20 |
| | | | 236/1 A |
| 5,468,143 A * | 11/1995 | Weber | F23D 14/64 |
| | | | 431/207 |
| 5,950,615 A * | 9/1999 | Anderson | F24C 1/10 |
| | | | 119/305 |
| 6,000,934 A | 12/1999 | Shavers | |
| 6,889,685 B2 * | 5/2005 | Dane | F23D 14/06 |
| | | | 126/39 B |
| 2005/0142509 A1 | 6/2005 | Kim | |

* cited by examiner

LOW PROFILE BROODER

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIALS SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to a brooder having a minimized vertical profile and, more particularly, to a brooder with a non-vertical fuel mixing tube and with a baffle in the fuel distribution chamber to optimize the heating distribution.

Description of the Related Art

The poultry industry uses heaters within poultry houses to raise the interior temperature to levels more favorable for the growth and well-being of the birds therein. Such a heater is referred to in the poultry industry as a brooder.

Typically, a plurality of brooders are suspended from overhead, positioned relatively closely above the flock to provide the best heating for the birds.

An archetypal brooder is fired by gas fuel. Various fuels are used, including natural gas, propane, butane, and liquefied petroleum gas.

A brooder includes a venturi, also known as a mixing tube, in which the gas fuel mixes with ambient air. The fuel and air mixture is conveyed by the venturi to a burner, which sometimes comprises a burner base and a burner cap. That burner often includes corrugations, scalloping, or apertures proximate to or around its perimeter, forming multiple burner ports. At the burner ports, the fuel and air mixture is ignited. The burning fuel heats an emitter located adjacent to and above the burner ports. The flame wicks along the inner side of the emitter where it transfers heat through conduction, radiation, and combustion byproduct transmission through convection. To maximize the efficiency of the brooder, the flame shape emerging from each burner port (or burner section of any shape) needs to be precisely proportioned, which can only be accomplished by tightly controlling the amount of fuel emerging from each burner port. If the flame is too short, it will be unable to effectively realize the heat transfers previously mentioned, which results in relatively cooler surfaces on the emitter that can be seen from the outside as a non-equal, non-uniform glow on the emitter surface. If the flame is too long, it will impinge on the emitter surface and result in poor combustion of the fuel, creating excessive amounts of carbon monoxide, and further will overheat the emitter resulting in reduced lifespan of the components. The heated emitter warms the interior of the poultry house by radiant heat transfer. A canopy is located above the emitter, which reflects heat from the emitter back downwardly toward the flock.

Typically, a brooder's venturi is oriented vertically. This usual vertical orientation provides an advantage in that the fuel and air mixture thereby delivered to the burner has substantially the same velocity across the venturi downstream end cross-section and thus tends to be symmetrically distributed to the perimeter burner ports, which in turn provides the most efficient heating to the emitter and thus the most efficient use of the fuel to heating the interior of the poultry house.

The vertical orientation of the brooder's venturi causes a disadvantage, however, inasmuch as it adds to the vertical height of the brooder. The venturi must be of a length adequate to allow sufficient mixing of the fuel and air between the venturi's upstream end and its downstream end, and therefore cannot be arbitrarily shortened. As noted, for optimal poultry farming, a brooder in use should be close to the poultry. However, gathering the birds for removal from the poultry house, once they have matured and are ready for further processing, usually involves the use of machinery, or if not then the work of humans, within the interior of the poultry house. Such gathering prerequires raising the brooders within a poultry house to try to allow for sufficient clearance and operation of the machinery and/or movement of humans. But the added brooder dimension from the vertical venturi increases the risk of interference with the gathering machinery and/or creates obstacles for workers within the poultry house.

It would thus be an improvement to provide a brooder with a minimized vertical profile. However, reducing the vertical profile of a brooder by orienting the venturi in other than a vertical path risks causing an asymmetrical heating pattern upon the emitter and consequent suboptimal heating and suboptimal use of fuel. For a non-vertical venturi to connect to a horizontal burner base, the fuel flow path must turn. That turn causes the fuel and air mixture to exit the non-vertical venturi, and to enter the burner, at unequal velocities across the cross-section of the downstream end of the non-vertical venturi as a consequence of the fluid dynamics of the path of the mixture having turned. Thus the volume of the fuel and air mixture that passes out of the non-vertical venturi and into the burner, per unit of time, differs across the cross-section of the downstream end of the non-vertical venturi. The differing velocities and flow rate of the fuel and air mixture, if not corrected, causes the flames emerging from the burner ports to be unequal. Because the flame is in communication with an emitter, which is positioned at a precise, equal distance from the burner ports, the flame size from each port must be precisely proportioned. Only when the flames emerging from the burner ports are all of the same length can an even, uniform, and optimum heating of the emitter be achieved. Such an optimal result cannot be accomplished with a non-vertical venturi unless the differing velocities and flow rate of the fuel and air mixture conveyed to the burner from the non-vertical venturi are equalized.

In view of the foregoing, it would be desirable to provide a brooder with a nonvertical venturi and thus a lower vertical profile, yet still achieve uniform heating of the emitter. It would be also be desirable for such a brooder with a lower vertical profile to have uniform emitter heating even with different fuels, such as natural gas, propane, butane, and liquefied petroleum gas. Ideally, such a brooder would maximize the use of existing components, such as the canopy, emitter, burner cap, and burner base, both to save redesign costs and to enable easier repairs and/or component replacement. Of course, minimizing the expense of such a design would be an advantage. And, recognizing that poultry houses tend to be dusty environments and that therefore brooders therein require periodic cleaning such as by air blowers, preferably such a brooder would have simplified, easy-to-clean components.

In view of the foregoing, the present invention relates to an improvement upon the known systems and methods of brooders, and provides distinct advantages over the conventional systems and methods.

BRIEF SUMMARY OF THE INVENTION

A low profile brooder is provided. As revealed in the following description and the figures herein, this invention discovers a minimized vertical brooder profile having an equal, uniform heating of the emitter in a simplified, efficient design. This invention achieves such performance even with different fuels, maximizes the use of existing components, and is simplified and easy to clean. This invention discovers that, to accomplish such functionality with the use of a non-vertical venturi, the needed precision in flame size control requires a purposely configured and positioned baffle interacting with the fuel and air mixture flow to each burner port.

In accordance with certain aspects of certain embodiments of the present technology, a low profile brooder may comprise a burner base, the burner base having an upper surface and an opposing lower surface, and defining a central axis. A venturi with an upstream end and a downstream end may be disposed with its downstream end proximate the lower surface of the burner base. The venturi may define a fuel flow path between the upstream end and the downstream end, the fuel flow path residing at least partially at an angle divergent from the central axis. The brooder may include a baffle, the baffle residing proximate to the upper surface of the burner base. Additionally and/or alternatively, in various embodiments one or more of the following features may also be included:

(a) the fuel flow path may reside at least in part radial to the central axis, the radiant defining a first polar direction from the central axis;
(b) the baffle may be attached to the upper surface at a location in the first polar direction from the central axis;
(c) the baffle may be attached to the upper surface;
(d) the baffle may include a lower opening;
(e) the baffle may be at least partially planar, the at least partial plane disposed perpendicular to a radiant extending from the central axis; and/or
(f) the baffle may be rectangular and further may include first and second corner chamfers.

In accordance with additional aspects of other embodiments of the present technology, a low profile brooder may comprise a burner base, the burner base defining a central axis. A distribution chamber may be defined above the burner base. A baffle may reside in the distribution chamber. A venturi may at least in part extend away from the central axis, the venturi being in fluid communication with the burner base at the central axis. Additionally and/or alternatively, in various embodiments one or more of the following features may also be included:

(a) the baffle may be attached to the burner base;
(b) the venturi may extend away from the central axis at least in part in a first direction, and the baffle may reside apart from the central axis and in the first direction from the central axis;
(c) the venturi may extend away from the central axis at least in part in a first direction, the baffle may be at least partially planar, the baffle may reside in the distribution chamber apart from the central axis in the first direction from the central axis, and the at least partial plane may be perpendicular to a radiant from the central axis;
(d) the baffle may be at least partially planar, the at least partial plane being parallel to the central axis;
(e) the baffle may be at least partially planar, may be rectangular, and may include first and second chamfered upper corners; and/or
(f) the baffle may include a lower opening proximate the burner base.

In accordance with still further aspects of other embodiments of the present technology, a low profile brooder may comprise a venturi, a burner base, a burner cap, and a baffle. The burner base and the burner cap may reside adjacent to each other, with the burner cap disposed above the burner base, may define a central axis, and may define between them a distribution chamber. The burner base and the burner cap may also define a periphery, the periphery defining a burner port. A venturi may also be included, residing below the burner base and in fluid communication with the distribution chamber at the central axis. The venturi may have an upstream end and a downstream end, and may define a fuel flow path between the upstream end and the downstream end. The fuel flow path may reside at least partially at one or more of an acute angle, a perpendicular angle, and an obtuse angle to the central axis. A baffle may reside in the distribution chamber between the central axis and the periphery. Additionally and/or alternatively, in various embodiments one or more of the following features may also be included:

(a) the baffle is attached to the burner base.
(b) the baffle is perpendicular to at least a portion of the burner base.
(c) the baffle is at least partially parallel to the central axis.
(d) the baffle includes a panel, the panel being at least partially planar, and the at least partial baffle plane is disposed perpendicular to a radiant extending between the central axis and the periphery.
(e) the baffle includes a lower opening and opposing upper corner chamfers.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The purpose of the Abstract hereinabove is to enable the United States Patent and Trademark Office, and the public generally, to determine quickly from a cursory inspection the nature of the technical disclosure. The Abstract is not provided for interpreting the scope of the claims herein, nor to define the invention or the application, nor to be limiting in any way as to the scope of the invention.

BRIEF DESCRIPTION OF THE DRAWINGS

The details of the present invention, as to both its structure and its operation, can be understood with reference to the accompanying drawings, in which.

It should be noted that the drawings discussed above and below are not to scale in all instances, but may have exaggerated dimensions in some respect to illustrate the principles of the invention.

DETAILED DESCRIPTION OF REPRESENTATIVE EMBODIMENTS

Reference will now be made in detail to the presently preferred embodiments of the invention, one or more examples of which are illustrated in the drawings. Each example is provided by way of explanation of the invention, and is not meant as a limitation of the invention. For example, features illustrated or described as part of one embodiment may be used with a second embodiment to yield a third embodiment. It is intended that the present application include such modifications and variations as come within the scope and spirit of the invention. Repeat use of reference characters throughout the present specification and appended drawings is intended to represent the same or analogous features or elements of the invention.

Before any embodiments of the invention are explained in detail, it is to be understood that the invention is not limited in its application to the details of construction or to the arrangement of components set forth in the following description or illustrated in the drawings. The invention is capable of other embodiments and of being practiced or of being carried out in various ways.

It is to be understood that the phraseology used herein is for the purpose of description and should not be regarded as limiting. The use of formatives of the words "include," "comprise," and "have" is meant to encompass the items listed thereafter and equivalents thereof, as well as additional items.

Unless specified or limited otherwise, the terms "connected" and "carried by" are used broadly and encompass direct and indirect mountings, connections, supports, or couplings. Further, such phraseology is not limited to physical or mechanical connections or couplings.

As used herein, the terms "upstream" and "downstream" refer to the relative location of components in a fluid pathway. Thus, for example, in the context of a venturi in a brooder, "upstream" is relatively closer to the fuel supply and "downstream" is relatively closer to the burner base.

As used herein, the terms "above" and "below" are with gravitational reference. Thus, a component is "above" another if, when the present technology is in regular use, that component is gravitationally higher than the other.

A brooder 10 is disclosed. The brooder 10 includes a burner base 30, a burner cap 40, and emitter 60, a venturi 20, a baffle 50, and a canopy 80.

The burner base 30 may have an upper surface 31 and an opposing lower surface 32. The burner base 30 may define a central axis 11, the central axis 11 extending from the upper surface 31 to the lower surface 32. Within the upper surface 31, the burner base 30 may define a depression 33. The burner base 30 may be round or of any other advantageous shape.

The burner cap 40 may be disposed above the burner base 30. The burner cap 40 may be round or of any other advantageous shape. In some embodiments, the burner cap 40 and the burner base 30 may reside adjacent to each other. The burner base 30 and the burner cap 40 may define between them a distribution chamber 45, in which the fuel is distributed. In certain configurations, the burner base 30 and the burner cap 40 may define a periphery, and in some examples the periphery may define a burner port 46 and/or 47. The burner base 30 and burner cap 40 assembly may also include corrugations 43, 44 around its perimeter, forming multiple burner ports 46, 47.

In some embodiments, the burner base 30 and the burner cap 40 may be aspects of an integral burner, or a burner in which a burner base 30 and a burner cap 40 have been welded or otherwise joined together to form an integral burner. As to those embodiments, for clarity the within disclosure will refer to the lower aspect of such a burner as the burner base 30 and the upper aspect of such a burner as the burner cap 40, it being understood that the burner so configured is nevertheless integral and/or welded or otherwise joined together. Further, in some examples of those embodiments, burner ports 46 and/or 47 may be molded, drilled, or otherwise made proximate to or about the periphery of such a burner.

As described herein, a burner port 46 and/or 47 is an aperture defined in the burner through which the fuel and air mixture may pass from the interior of the burner to the exterior of the burner.

The emitter 60 may have an inner surface 64 and an outer surface 63. Likewise, the emitter 60 may have an upper edge 61 and an opposing lower edge 62. The lower edge 62 may reside proximate to the burner cap 40 and the burner base 30. In some instances, the emitter 60 may be shaped as an inverted frustoconical, but other shapes may be used as beneficial in other instances.

The venturi 20 is also sometimes referred to as a mixing tube. The venturi 20 may be understood to have an upstream end 21 and a downstream end 22. Fuel is introduced into the venturi 20 at the upstream end 21, and mixes with ambient air that is drawn into the venturi 20 at the upstream end 21. The venturi 20 may be of any length adequate to allow sufficient mixing of the fuel and air between the upstream end 21 and the downstream end 22. The venturi 20 may also define one or more cross-sections along its length, including round, oval, elliptical, square, polygonal, curvilinear, or any combination of two or more of the foregoing.

Along its length, the venturi 20 may be straight, or curved, or of any other shape or combination of shapes, depending on the needs of the particular application.

The venturi 20 may reside, at least in part, below the burner base 30. Its downstream end 22 may be disposed proximate to the lower surface 32 of the burner base 30. In some instances, the venturi 20 downstream end 22 may be attached directly to the burner base 30, and in other instances it may be attached indirectly to the burner base 30; in either instance, the venturi 20 may be attached to the burner base 30 at any angle.

The venturi 20 may be in fluid communication with the burner base 30. In particular embodiments, the venturi 20 may be in fluid communication with the burner base 30 at the central axis 11.

The venturi 20 extends away from the central axis 11 at least in part in what may be defined as a first direction.

The venturi 20 may define a fuel flow path 25 between the upstream end 21 and the downstream end 22. The fuel flow path 25 may extend, at least in part, away from the central axis 11. Selective, nonlimiting illustrations provide the fuel flow path 25 residing at least partially at an angle divergent from the central axis 11. Other examples include fuel flow path 25 residing at least in part radial to the central axis 11, the radiant 12 defining a first polar direction 27 from the central axis 11. Certain configurations provide that the fuel flow path 25 resides at least partially at one or more of an acute angle, a perpendicular angle, and an obtuse angle to the central axis 11.

A venturi 20 mounting arm 23 may also be provided, for attachment of other devices.

A venturi 20 orifice adaptor mount 24 may also be included, and adapted for receipt of an orifice adaptor 70 at the distal end of the burner tube 91.

The baffle 50 may be of polygonal shape, a curvilinear shape, U-shaped, V-shaped, inverted U-shaped, inverted V-shaped, asymmetrical, or any combination of two or more of the foregoing, as found useful in particular applications. In some uses, the baffle 50 may be at least partially planar. In particular examples, the baffle 50 may be at least partially planar and the at least partial plane may be perpendicular to a radiant 12 from the central axis 11. In some examples, the baffle 50 may be at least partially planar and the at least partial plane may be parallel to the central axis 11.

In a specific example, the baffle 50 may be rectangular. Certain uses of a baffle 50 may also include first and second chamfers 55, 56 of the baffle 50. In particular configurations, the upper corners of the baffle 50 may be chamfered. In all such instances, the chamfers 55, 56 may be linear, polygonal, curvilinear, or irregular, as particular uses may deem advantageous.

The baffle 50 may include one or more opening through the baffle 50. Some configurations provide that the one or more opening resides lower in the baffle 50. In a particular configuration, the one or more opening may reside at the bottom of the baffle.

Certain baffles 50 may include a first leg 52, and other baffles 50 may include a first leg 52 and a second leg 53. Other baffles 50 may be understood to include one or more panels 51.

The baffle 50 may be positioned anywhere inside the distribution chamber 45, including proximate the downstream end 22 of the venturi 20 at the burner base 30. In some designs, the baffle 50 may reside in the depression 33 in the burner base 30. The baffle 30 may reside proximate the upper surface 31 of the burner base 30. Some examples locate the baffle 50 in the distribution chamber 45 between the central axis 11 and the periphery.

The baffle 50 may be oriented at any angular orientation. Depending on the application, (a) the baffle 50 may be at least partially parallel to the central axis 11, (b) the baffle 50 may be perpendicular to at least a portion of the burner base 30; and/or (c) the baffle 50 may reside in the distribution chamber 45 apart from the central axis 11 in the first direction from the central axis 11 defined by the venturi 20.

Some designs include the baffle 50 having a panel 51, the panel 51 being at least partially planar, and the at least partial baffle 50 plane is disposed perpendicular to a radiant 12 extending between the central axis 11 and the periphery.

Regarding attachment, the baffle 50 may be attached to the burner base 30. It may be attached to the upper surface 31 of the burner base 30. Still further, it may be attached to the upper surface 31 of the burner base 30 at a location in the first polar direction 27 from the central axis 11 defined by the venturi fuel flow path 25.

In a certain example, the baffle 50 is rectangular and includes first and second linear chamfers 55, 56 at its opposing upper corners. The baffle 50 also has a lower opening 57 disposed between two legs 52, 53 that are attached to the burner base 30 within the depression 33. The baffle 50 is at least partially parallel to the central axis 11, is perpendicular to at least a portion of the burner base 30; and resides in the distribution chamber 45 apart from the central axis 11 in the first direction from the central axis 11 defined by the venturi 20. The baffle 50 is disposed perpendicular to a radiant 12 extending between the central axis 11 and the periphery, and resides directly vertically above the centerline of the venturi 20. Flow of the fuel/air mixture has been found to be tightly controlled and precisely delivered by use of this design, including the baffle of this design, in providing an optimum symmetrical pattern to the burner ports 46, 47, by interaction of the mixture with the functionality of the baffle 50 as so configured. The resulting flames at the burner ports 46, 47 is thus uniform in heating of the emitter 60. The brooder 10, with the baffle so configured and positioned, is functional even with different fuels, such as natural gas, propane, butane, and liquefied petroleum gas.

Other components of the brooder 10 may include a control box 92 and gas valve 95 for controlling the function of the brooder 10, the gas valve 95 regulating the flow of fuel to the brooder 10 and the control box 92 directing the gas valve 95. The control box 92 may be entirely manually operated, or it may be entirely automatic (including with timers for given fuel supply chronologies, or both). A burner tube 91 may have a valve end 911 attached to the gas valve 95, in some instances with a compression fitting 94, and an orifice end 912 residing proximate the upstream end 21 of the venturi 20, conveying fuel to the venturi 20. An orifice adapter 70 may be included at the downstream end 912 of the burner tube 91; different sized orifices may be used or switched with orifice adaptor 70, to provide optimal functionality of the brooder 10 depending on the type of fuel used, such as natural gas, propane, butane, and liquefied petroleum gas—different sized orifice adaptors 70 may be used with each type of fuel. An air restrictor cup 90 may be positioned at the upstream end 21 of the venturi 20, optionally including one or more apertures such as apertures 901, 902, to allow tuning of the fuel/air mixture as a function, for example, of atmospheric or other conditions. An electrode 93 may reside at or near the burner base 30/burner cap 40 periphery, for igniting the fuel/air mixture, the electrode 93 being electrically energized by an ignition cable 96; in other examples of the present technology, a pilot light (not shown) may instead be included in place of the electrode 93 and the ignition cable 96. The brooder 10 may include a manifold support bracket 97 and a label plate holder 98. A hanging bracket 99 may be included at the top of the brooder 10, to facilitate suspending the brooder 10.

Figure 1:
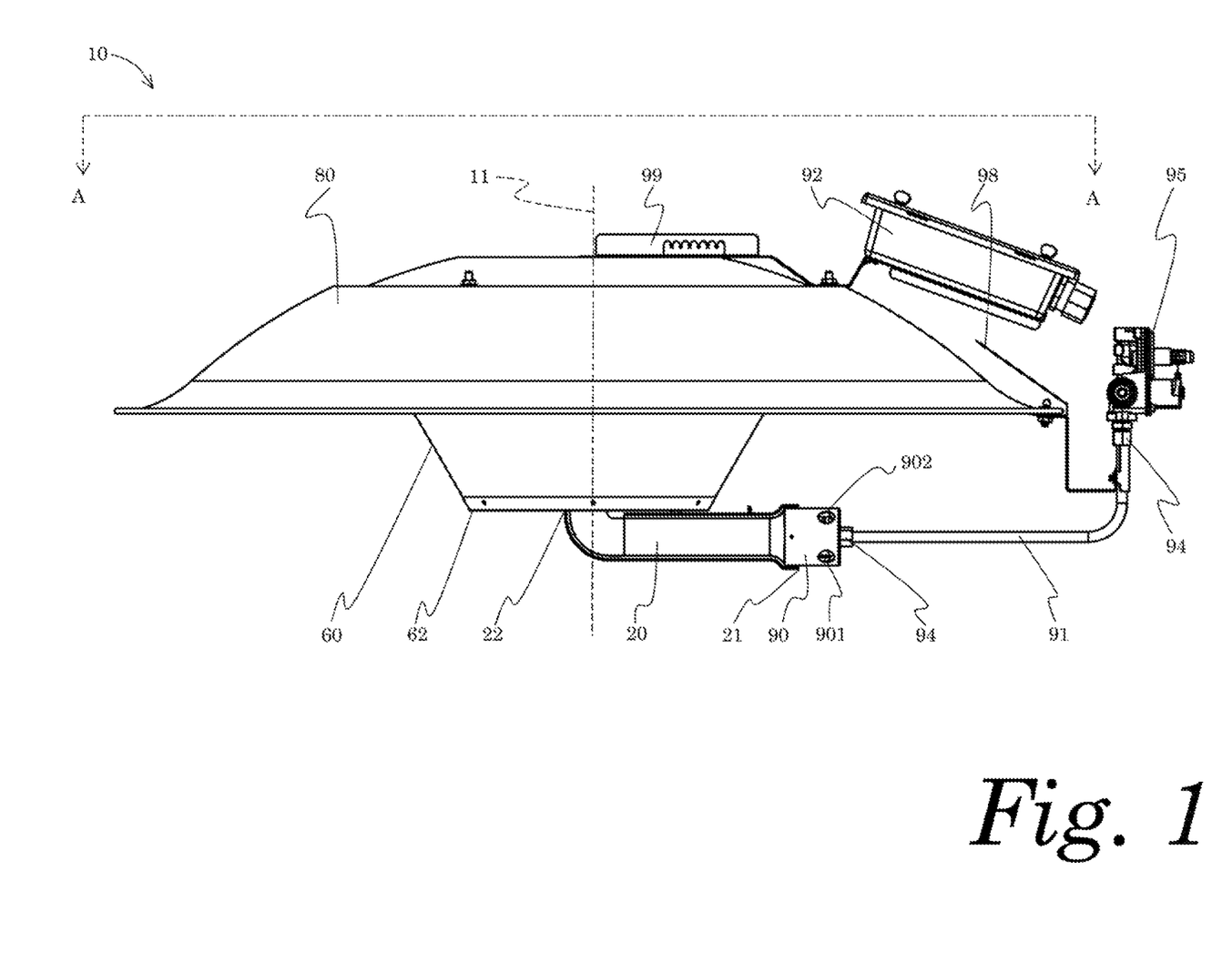
FIG. 1 is a side elevation view of a low profile brooder according to an embodiment of the present invention.
Figure 2:
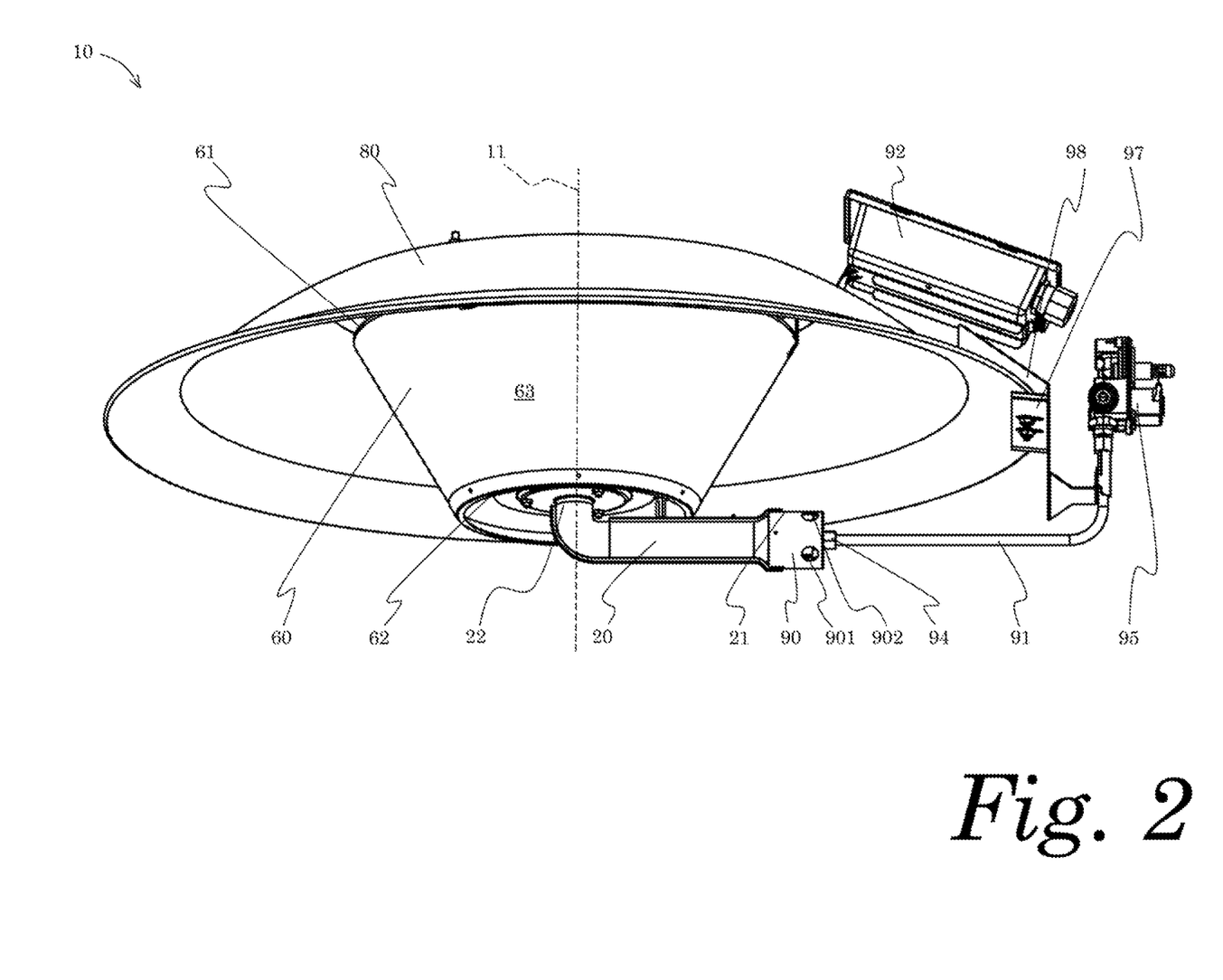
FIG. 2 is a perspective view, from a lower perspective, of a low profile brooder according to an embodiment of the present invention.

The appended drawings illustrate embodiments of the brooder 10 of the present invention. FIGS. 1 and 2 illustrate various such components. As depicted in FIGS. 1 and 2, a central axis 11 is defined. In the embodiment illustrated in FIGS. 1 and 2, the emitter 60 has an inverted frustoconical shape. The emitter 60 has an outer surface 63, an upper edge 61, and an opposing lower edge 62 (see FIG. 3). The venturi 20 has an upstream end 21 and a downstream end 22, and resides at least in part below the burner base 30. Its downstream end 22 is disposed proximate to the lower surface 32 of the burner base 30 (not shown). Along its length, the venturi 20 in this embodiment is straight proximate the upstream end 21, straight along its middle, and curved in its approach to the burner base 30 (not shown). As illustrated, the venturi 20 extends away from the central axis 11 at least in part in what may be defined as a first direction.

Other components of the brooder 10 are also illustrated in FIGS. 1 and 2, including a control box 92 and gas valve 95. A burner tube 91 is attached to the gas valve 95, with an orifice end 912 end residing proximate the upstream end 21 of the venturi 20. An air restrictor cup 90 is positioned at the upstream end 21 of the venturi 20, including apertures 901, 902. The brooder 10 includes a manifold support bracket 97 and a label plate holder 98. A hanging bracket 99 is included at the top of the brooder 10, to facilitate suspending the brooder 10 from overhead.

Figure 3:
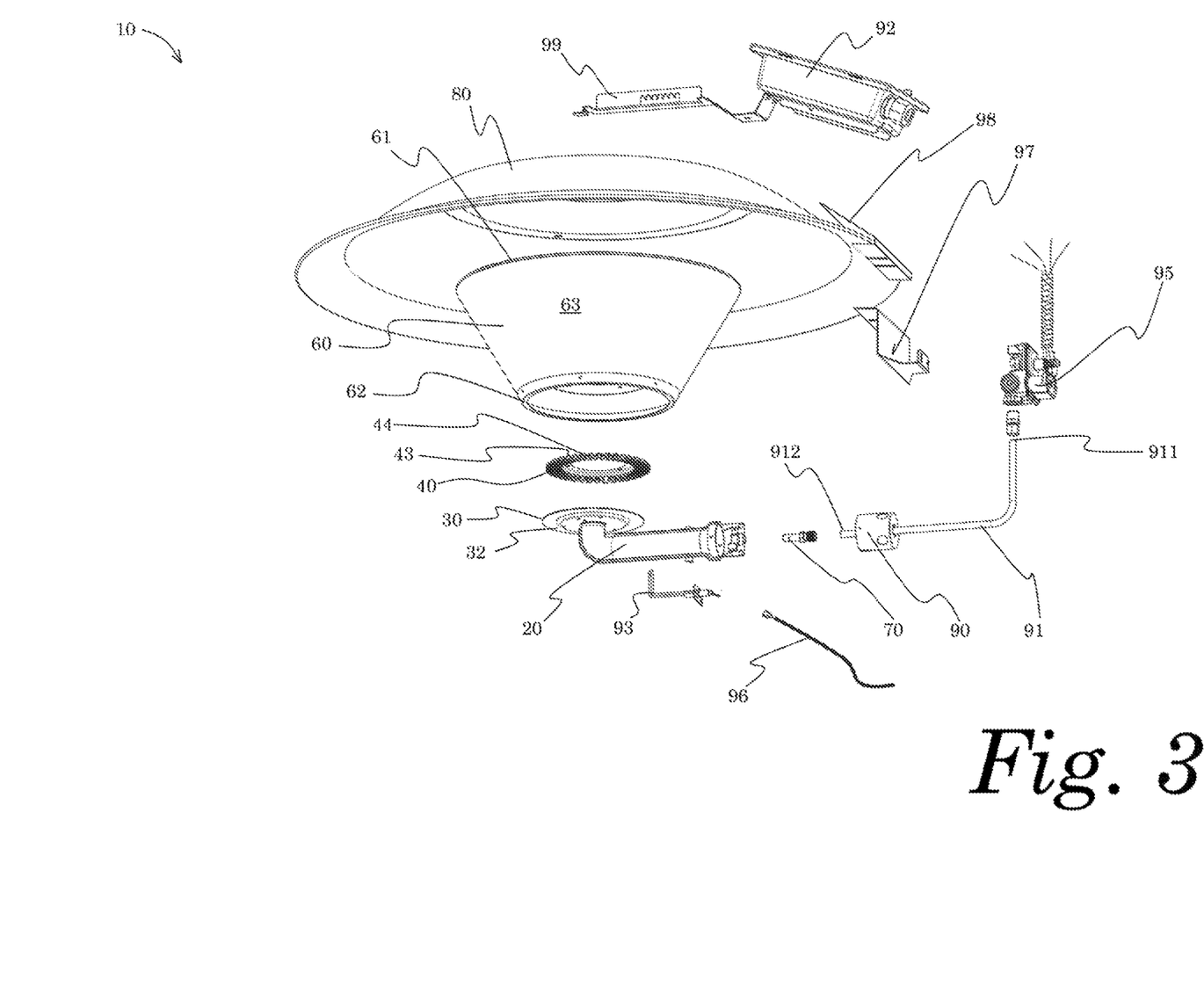
FIG. 3 is an exploded perspective view of a low profile brooder according to an embodiment of the present invention.
Figure 4:
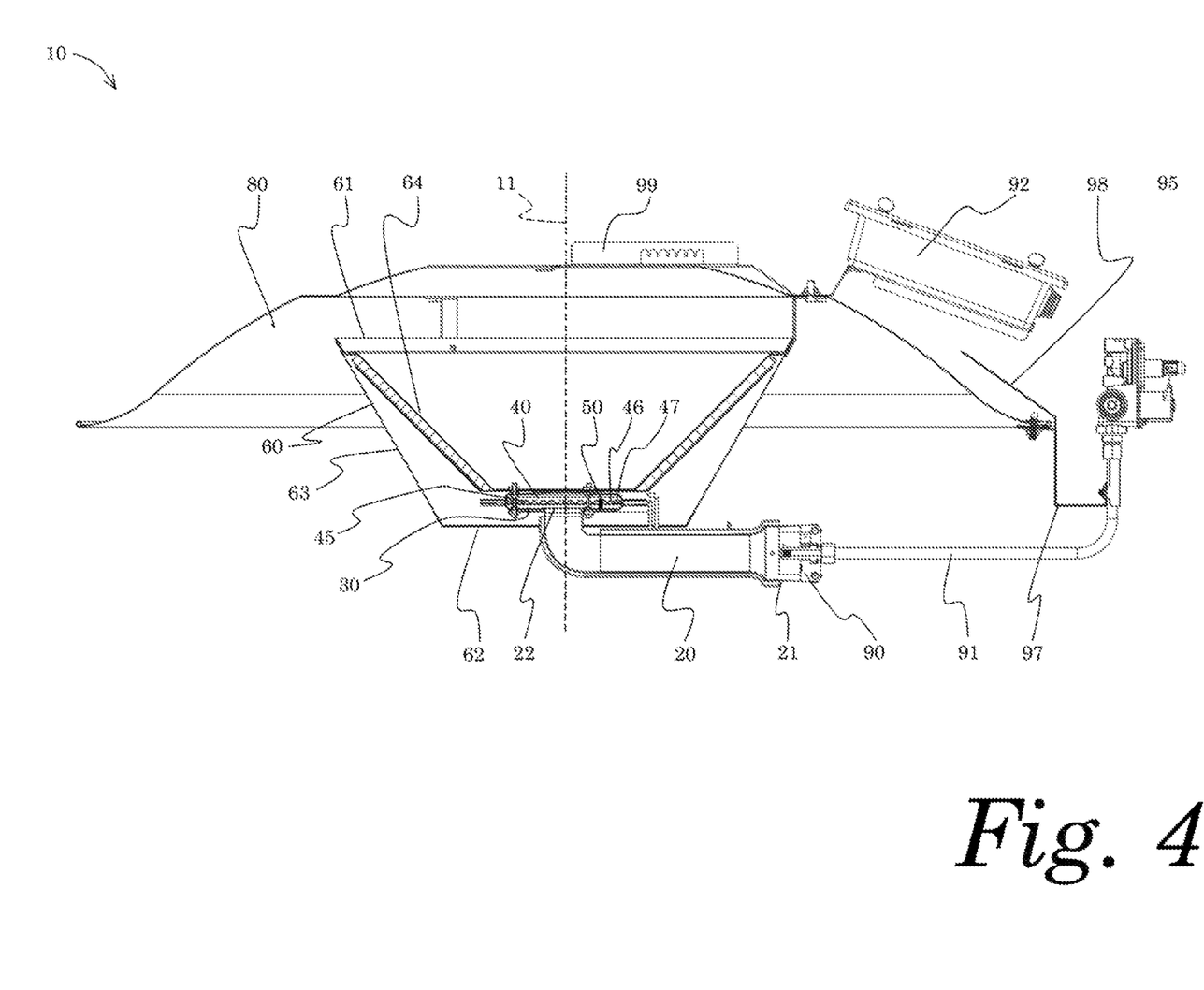
FIG. 4 is a cross-sectional view, taken at A:A in FIG. 1, of a canopy, emitter, burner cap, burner base, and venturi of a low profile brooder according to an embodiment of the present invention.

FIGS. 3 and 4 also illustrate various components of embodiments of the brooder 10. The control box 92 and the gas valve 95 are depicted. A burner tube 91 leads from the gas valve 95 to the venturi 20. An orifice adapter is included at the downstream end 22 of the burner tube 91, with an orifice sized to provide optimal functionality of the brooder 10 depending on the type of fuel used, such as natural gas, propane, butane, and liquefied petroleum gas. An air restrictor cup 90 has been positioned at the upstream end 21 of the venturi 20, optionally including apertures 901, 902. An electrode 93 is likewise included, for igniting the fuel/air mixture, the electrode 93 being electrically powered by an ignition cable 96. The brooder 10 includes a manifold support bracket 97 and a label plate holder 98. A hanging bracket 99 positioned at the top of the brooder 10 facilitates suspending the brooder 10 from overhead.

The venturi 20 is disposed below the burner base 30 and has an upstream end 21 and a downstream end 22. Its downstream end 22 resides proximate to the lower surface 32 of the burner base 30. Fuel introduced into the venturi 20 at the upstream end 21 from the downstream end 22 of the burner tube 91, and mixes with ambient air drawn into the venturi 20 at the upstream end 21 of the venturi 20. The venturi 20 in this embodiment is straight from its upstream end 21 and along its length, but curves as it nears the burner base 30.

The burner base 30 has an upper surface 31 and an opposing lower surface 32. The burner base 30 defines a central axis 11, the central axis 11 extending from the upper surface 31 to the lower surface 32. The burner cap 40 is disposed above the burner base 30 and resides adjacent to the burner base 30. The burner base 30 and the burner cap 40 define between them a distribution chamber 45. They also define a periphery. The burner cap 40 also includes corrugations 43, 44 around its perimeter, forming multiple burner ports 46, 47.

The emitter 60 has an inner surface 64 and an outer surface 63, an upper edge 61 and an opposing lower edge 62. The lower edge 62 resides proximate to the burner cap 40 and the burner base 30. The emitter 60 in this example is shaped as an inverted frustoconical.

The venturi 20 is in fluid communication with the burner base 30 at the central axis 11. The venturi 20 extends away from the central axis 11 at least in part in what may be defined as a first direction.

A venturi 20 orifice adaptor mount 24 is also included, and has received an orifice adaptor 70 at the distal end of the burner tube 91.

A baffle 50 is also included (see FIG. 4). The baffle 50 is positioned inside the distribution chamber 45, proximate the downstream end 22 of the venturi 20 at the burner base 30. In the embodiment illustrated in FIG. 4, the baffle 50 resides in the depression 33 in the burner base 30.

Figure 5:
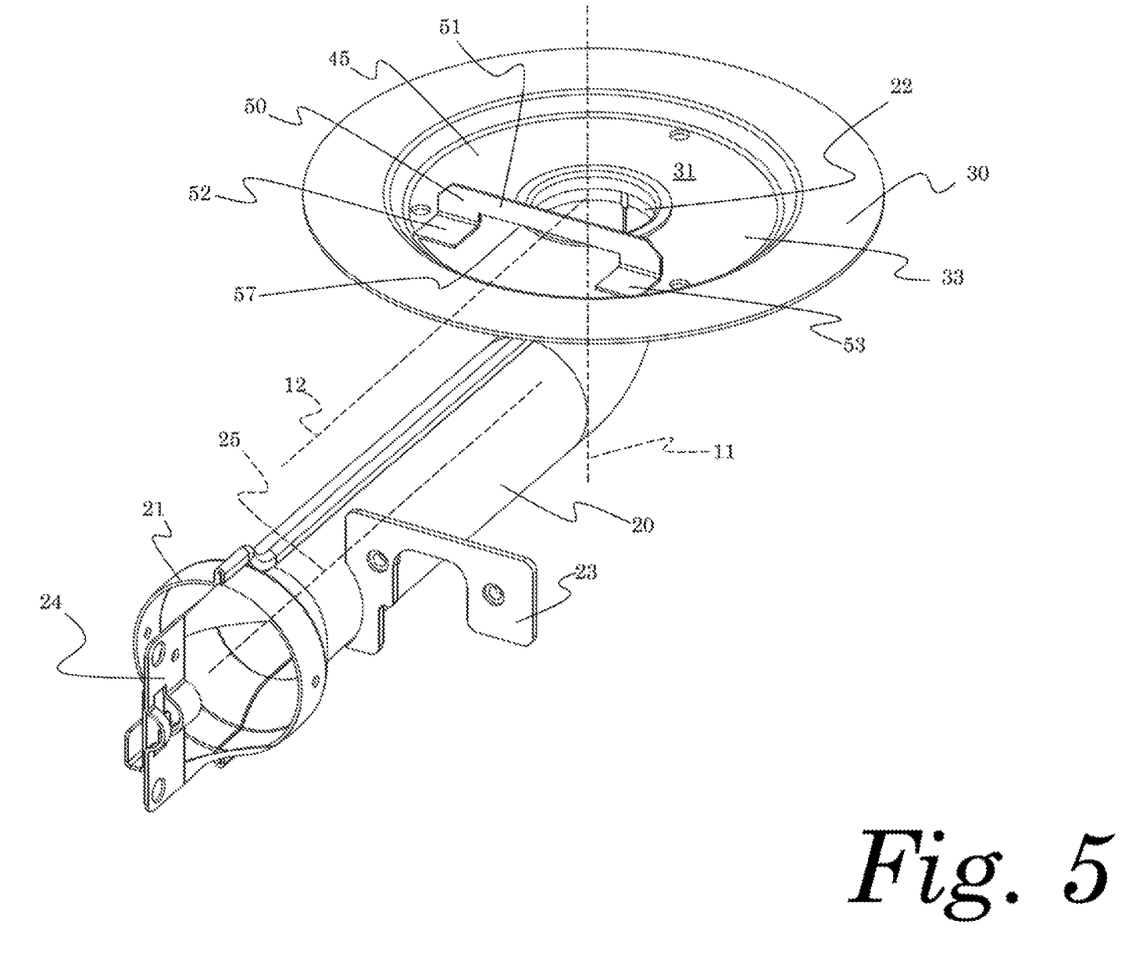
FIG. 5 is a perspective view of a venturi, burner base, and baffle of a low profile brooder according to an embodiment of the present invention.
Figure 6:
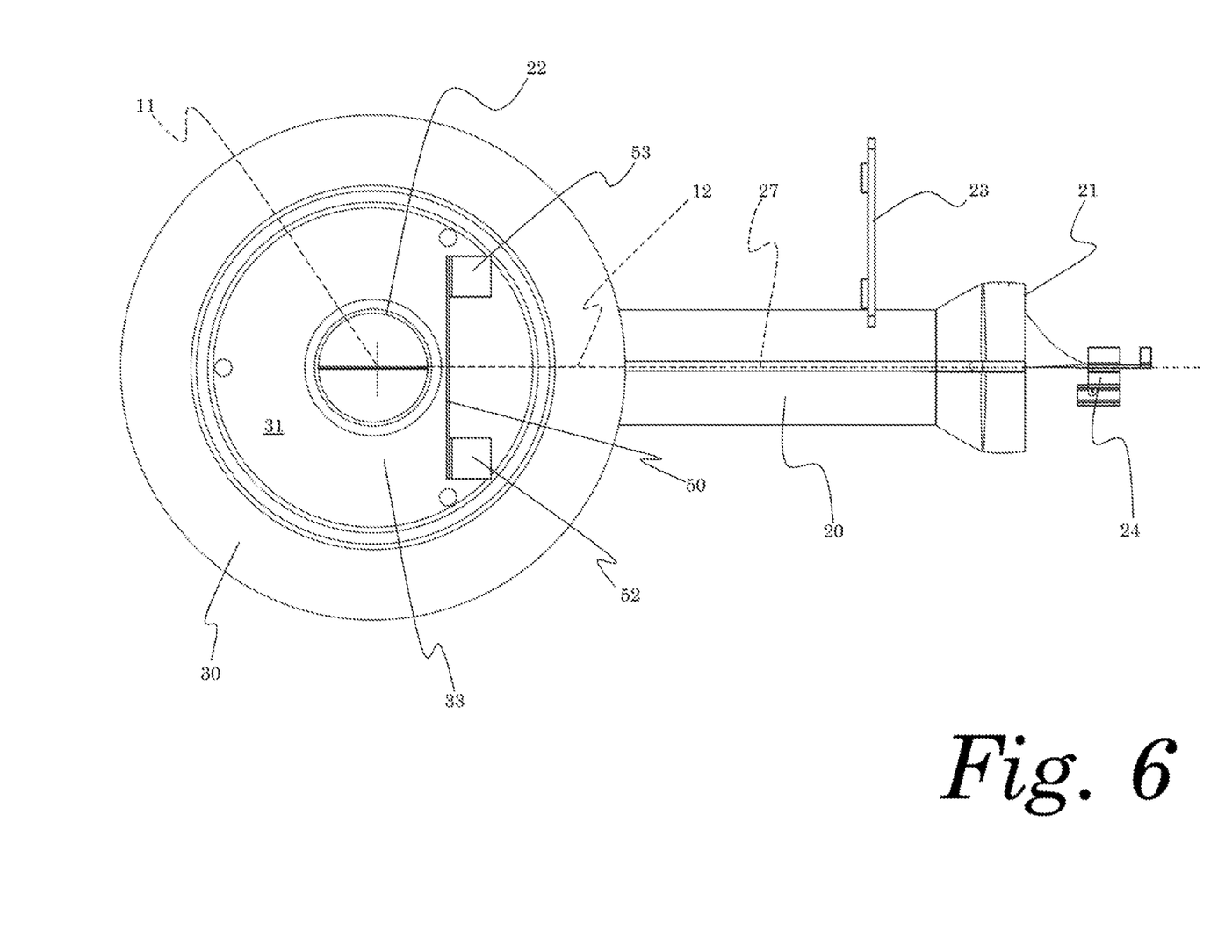
FIG. 6 is a top plan view of a venturi, burner base, and baffle of a low profile brooder according to an embodiment of the present invention.
Figure 7:
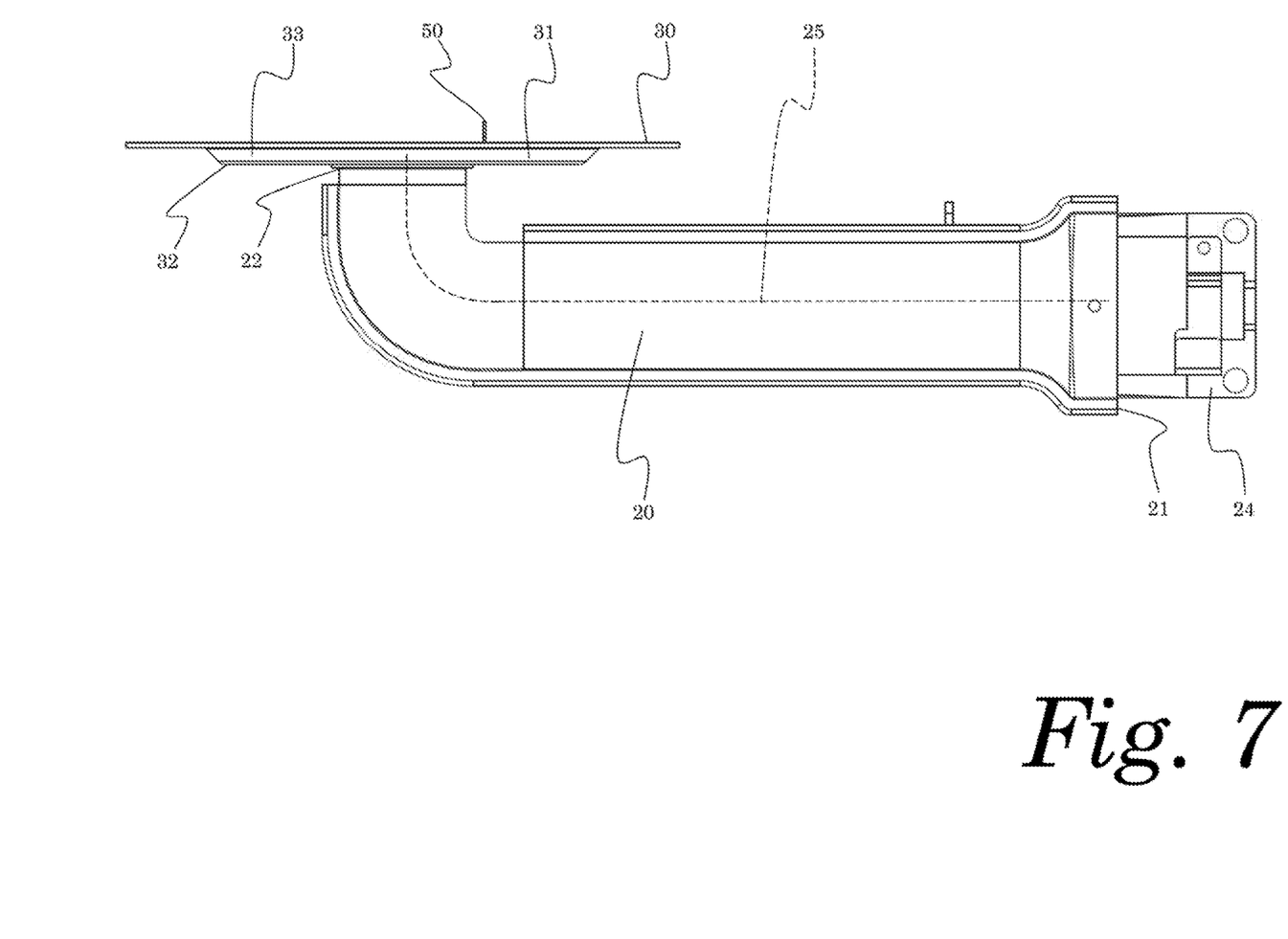
FIG. 7 is a side elevation view of a venturi, burner base, and baffle of a low profile brooder according to an embodiment of the present invention.

FIGS. 5, 6, and 7 illustrate embodiments of the burner base 30, baffle 50, venturi 20, and orifice adaptor mount 24. The burner base 30 has an upper surface 31 and an opposing lower surface 32, and defines a central axis 11, the central axis 11 extending from the upper surface 31 to the lower surface 32. Within the upper surface 31 the burner base 30 is defined a depression 33. The burner base 30 as illustrated is round.

The venturi 20 has an upstream end 21 and a downstream end 22. The venturi 20 in these embodiments defines a circular cross-section along its length. The venturi 20 is straight along its length from the upstream end 21, and turning upward near its downstream end 22. Its downstream end 22 is disposed proximate to the lower surface 32 of the burner base 30, in these embodiments, and is attached directly to the burner base 30. The venturi 20 is in fluid communication with the burner base 30 at the central axis 11.

The venturi 20 extends away from the central axis 11 at least in part in what may be defined as a first direction. The venturi 20 defines a fuel flow path 25 between the upstream end 21 and the downstream end 22, and the fuel flow path 25 extends, at least in part, away from the central axis 11. As illustrated, for example, in FIG. 6, the fuel flow path 25 resides at least in part radial to the central axis 11, the radiant 12 defining a first polar direction 27 from the central axis 11. As illustrated, for example, in FIG. 7, the fuel flow path 25 resides at least partially at an angle divergent from the central axis 11. Also as illustrated, for example, in FIG. 7, the fuel flow path 25 resides at least partially at one or more of a perpendicular angle.

The baffle 50 in these embodiments is rectangular and at least partially planar. The at least partial plane is perpendicular to a radiant 12 from the central axis 11. Likewise, in these embodiments the at least partial plane is parallel to the central axis 11. The baffle 50 includes first and second chamfers 55, 56 at the upper corners of the baffle 50; the chamfers 55, 56 in these embodiments is linear. The baffle 50 also includes a lower opening 57. Lower legs 52, 53 are included, and panel 51 is incorporated.

The baffle 50 is positioned proximate the downstream end 22 of the venturi 20 at the burner base 30, and resides in the depression 33 in the burner base 30. It will be noted that, in these embodiments, the baffle 50 resides proximate the upper surface 31 of the burner base 30 and is located in the distribution chamber 45 between the central axis 11 and the periphery.

In the embodiments illustrated in FIGS. 5, 6, and 7, the baffle 50 is at least partially parallel to the central axis 11, is perpendicular to at least a portion of the burner base 30, resides in the distribution chamber 45 apart from the central axis 11 in the first direction from the central axis 11 defined by the venturi 20, is disposed perpendicular to a radiant 12 extending between the central axis 11 and the periphery, and resides directly vertically above the centerline of the venturi 20.

The baffle 50 is attached to the upper surface 31 of the burner base 30 at a location in the first polar direction 27 from the central axis 11 defined by the venturi 20 fuel flow path 25.

A mounting arm 23 is provided, as is an orifice adaptor mount 24.

Figure 8:
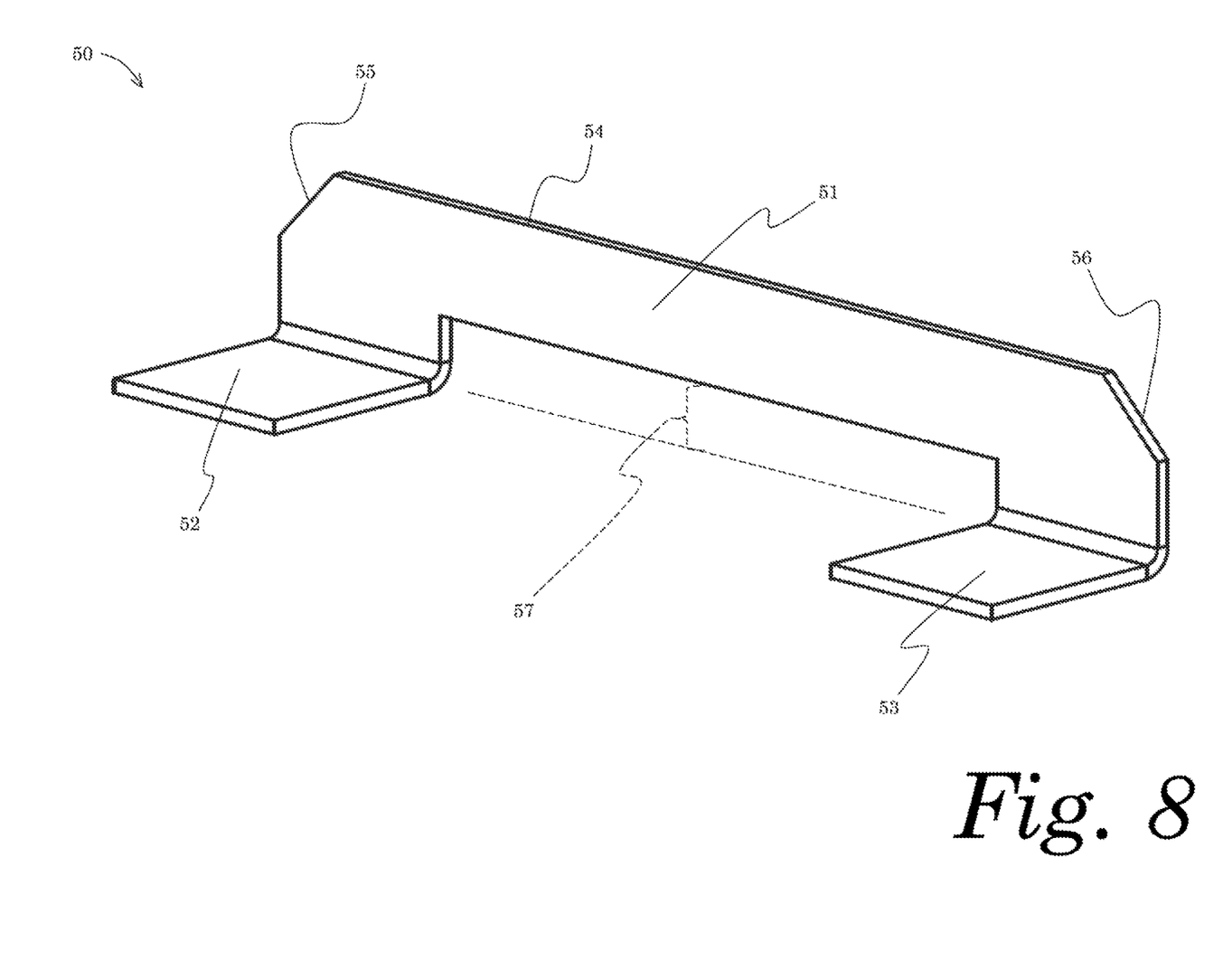
FIG. 8 is a perspective view of a baffle of a low profile brooder according to an embodiment of the present invention.

FIG. 8 illustrates an embodiment of the baffle 50. The baffle 50 in this embodiment is rectangular and at least partially planar. The baffle 50 includes first and second linear chamfers 55, 56 at the opposing upper corners, as well as a lower opening 57. Lower legs 52, 53 are included, panel 51 is incorporated, and upper limit 54 is also noted.

In operation, the brooder 10 is suspended from above by use of the hanging bracket 99. Fuel supplied to the brooder 10 is regulated by the gas valve 95, as controlled by the control box 92. The fuel is conveyed via the burner tube 91 to the upstream end 21 of the venturi 20. There ambient air is drawn into the venturi, and the fuel/air mixture may be advantageously controlled with the air restrictor cup 90. The fuel/air mixture flows through the venturi 20 along a fuel flow path 25 to the burner base 30 and into the distribution chamber 45 defined between the burner base 30 and the burner cap 40. Flow of the fuel/air mixture is precisely delivered and tightly controlled, in an optimum symmetrical pattern to the burner ports 46, 47, by interaction of the mixture with the prescribed interference of the baffle 50. The resulting flames at the burner ports 46, 47 is thus uniform in its heating of the emitter 60, providing the most advantageous performance of the brooder 10 in use of the fuel to provide heat to the flock of poultry below.

Accordingly, the brooder 10 aforedescribed provides a nonvertical venturi 20 and thus a minimized vertical profile, yet still achieving uniform heating of the emitter 60. The brooder 10 is functional even with different fuels, such as natural gas, propane, butane, and liquefied petroleum gas. The brooder 10 likewise maximizes the use of existing components, such as the canopy 80, emitter 60, burner cap 40, and burner base 30, minimizing the expense of such a design. The brooder 10 has simplified, easy-to-clean components. The brooder 10 accomplishes such functionality with a purposely configured and positioned baffle 50 interacting with the fuel and air mixture flow to each burner port 46, 47.

It should be appreciated that, in the above description of embodiments, various features are sometimes grouped together in a single embodiment, figure, or description for the purpose of streamlining the disclosure and aiding in the understanding of one or more of the various inventive aspects. This method of disclosure, however, is not be interpreted as reflecting an intention that any claim requires more features than are expressly recited in that claim. Moreover, any components, features, or steps illustrated and/or described in a particular embodiment herein, can be applied to or used with any other embodiment. Thus, it is intended that the scope of the inventions herein disclosed should not be limited by the particular embodiments described above, but should be determined only by a fair reading of the claims that may issue from the benefit of the within disclosure.

The invention claimed is:

1. A low profile brooder, comprising:
   a burner base, the burner base having an upper surface and an opposing lower surface and defining a central axis and a periphery;
   a venturi:
   having an upstream end and a downstream end, the downstream end disposed proximate to the lower surface;
   defining a fuel flow path between the upstream end and the downstream end, the fuel flow path residing at least partially at an angle divergent from the central axis; and
   a baffle, the baffle residing proximate to the upper surface and between the downstream end and the periphery.

2. The low profile brooder of claim 1, in which the fuel flow path resides at least in part radial to the central axis, the radiant defining a first polar direction from the central axis.

3. The low profile brooder of claim 2, in which the baffle is attached to the upper surface at a location in the first polar direction from the central axis.

4. The low profile brooder of claim 1, in which the baffle is attached to the upper surface.

5. The low profile brooder of claim 1, in which the baffle defines a lower opening.

6. The low profile brooder of claim 1, in which the baffle is at least partially planar, the at least partial plane disposed perpendicular to a radiant extending from the central axis.

7. The low profile brooder of claim 3, in which the baffle is rectangular and further includes first and second corner chamfers.

8. A low profile brooder, comprising:
   a burner base, the burner base defining a central axis;
   a distribution chamber defined above the burner base;
   a baffle residing in the distribution chamber; and
   a venturi in fluid communication with the burner base at the central axis,
   in which the venturi extends away from the central axis at least in part in a first direction,
   the baffle is at least partially planar, the baffle resides in the distribution chamber apart from the central axis in the first direction from the central axis, and the at least partial plane is perpendicular to a radiant from the central axis.

9. The low profile brooder of claim 8, in which the baffle is attached to the burner base.

10. The low profile brooder of claim 8, in which the venturi extends away from the central axis at least in part in a first direction, and in which the baffle resides apart from the central axis and in the first direction from the central axis.

11. The low profile brooder of claim 8, in which the baffle is at least partially planar, the at least partial plane being parallel to the central axis.

12. The low profile brooder of claim 8, in which the baffle is at least partially planar, is rectangular, and includes first and second chamfered upper corners.

13. The low profile brooder of claim 8, in which the baffle defines a lower opening proximate the burner base.

14. A low profile brooder, comprising:
   a venturi, a burner base, a burner cap, and a baffle;
   the burner base and the burner cap:
   residing adjacent each other, with the burner cap disposed above the burner base;

defining a central axis;

defining between them a distribution chamber;

defining a periphery, the periphery defining a burner port;

the venturi:
- residing below the burner base and in fluid communication with the distribution chamber at the central axis;
- having an upstream end and a downstream end;
- defining a fuel flow path between the upstream end and the downstream end;
- the fuel flow path residing at least partially at one or more of an acute angle, a perpendicular angle, and an obtuse angle to the central axis; and the baffle residing in the distribution chamber between the central axis and the periphery.

15. The low profile brooder of claim 14, in which the baffle is attached to the burner base.

16. The low profile brooder of claim 14, in which the baffle is perpendicular to at least a portion of the burner base.

17. The low profile brooder of claim 14, in which the baffle is at least partially parallel to the central axis.

18. The low profile brooder of claim 14, in which the baffle includes a panel, the panel being at least partially planar, and the at least partial baffle plane is disposed perpendicular to a radiant extending between the central axis and the periphery.

19. The low profile brooder of claim 14, in which the baffle defines a lower opening and opposing upper corner chamfers.

* * * * *